(12) United States Patent
Behm et al.

(10) Patent No.: US 9,225,744 B1
(45) Date of Patent: Dec. 29, 2015

(54) CONSTRAINED CREDENTIALED IMPERSONATION

(75) Inventors: Bradley Jeffery Behm, Seattle, WA (US); Gregory B. Roth, Seattle, WA (US); Matthew A. Estes, Aldie, VA (US); Eric Jason Brandwine, Haymarket, VA (US); Patrick J. Ward, Snoqualmie, WA (US)

(73) Assignee: Amazon Technologies, Inc., Reno, NV (US)

( * ) Notice: Subject to any disclaimer, the term of this patent is extended or adjusted under 35 U.S.C. 154(b) by 210 days.

(21) Appl. No.: 13/461,562

(22) Filed: May 1, 2012

(51) Int. Cl.
*G06F 17/00* (2006.01)
*H04L 29/06* (2006.01)

(52) U.S. Cl.
CPC ............... *H04L 63/20* (2013.01); *H04L 63/102* (2013.01)

(58) Field of Classification Search
CPC ............................. H04L 63/20; H04L 63/102

USPC .......................................................... 726/1, 3
See application file for complete search history.

(56) References Cited

U.S. PATENT DOCUMENTS

| 2008/0066159 A1* | 3/2008 | Dillaway et al. .................. 726/4 |
| 2010/0082989 A1* | 4/2010 | Bussard et al. ............... 713/176 |

* cited by examiner

*Primary Examiner* — Anthony Brown
(74) *Attorney, Agent, or Firm* — Kilpatrick Townsend & Stockton LLP

(57) ABSTRACT

Client impersonation is recognized by an access control service using servicer credentials to allow a servicer to impersonate a user's context while requesting actions be performed on a computing resource. A servicer may be requested to perform an action through impersonation, granting access to the context of a user related to the computing resource. The computing resource receives servicer credentials and impersonation information from the servicer. After verifying the servicer's authorization to perform actions under the context of the user, the servicer may attempt to perform the requested action. The action may be logged as performed by the servicer impersonating the user. The user may also be billed for any costs incurred.

31 Claims, 11 Drawing Sheets

CONSTRAINED CREDENTIALED IMPERSONATION

BACKGROUND

Delegation can allow an entity to perform tasks on behalf of another entity. With delegation, a developer may leverage the knowledge and work of another that may be more experienced in an area. In some environments, a user may provide their credentials to a service to act on behalf of the user. While this allows the service to perform actions as the user it also gives the service full access to the user's account, which may not be desirable. For example, a user can provide a credential to a load balancing service and the load balancing service can use the credential to manage load balancing for services associated with the user, as all actions are performed under the username. In other environments, a service may be granted permissions to access resources owned by another. The service receives permissions required to manage the resources assigned, such as through an access control list.

However, tracking delegation and using delegation can be difficult. In the case of distributing a username and password, all actions may appear to be performed by a user because the user's credential may be used to determine the actor logged as performing the action. In addition, upon any change to the credential, the credential must be redistributed to services that use the credential. For example, a database administrator may give its credentials to a service for managing databases. Changes would be attributed to the database administrator credential and not the service actually using the credential. In the case of access control lists, a service is granted access to a resource but the reasons for access may not be clear. For example, a service may be granted access to a file by two administrators for different reasons, such as logging and analytics. When the service accesses the file, it may be unclear under which permission the file is accessed as the service merely has permission to access the file. In some systems, delegation may not be possible. While various techniques have been employed to effectively perform delegation, due to the complexity of the tasks, the employed techniques are of varied success.

DETAILED DESCRIPTION

Figure 1:
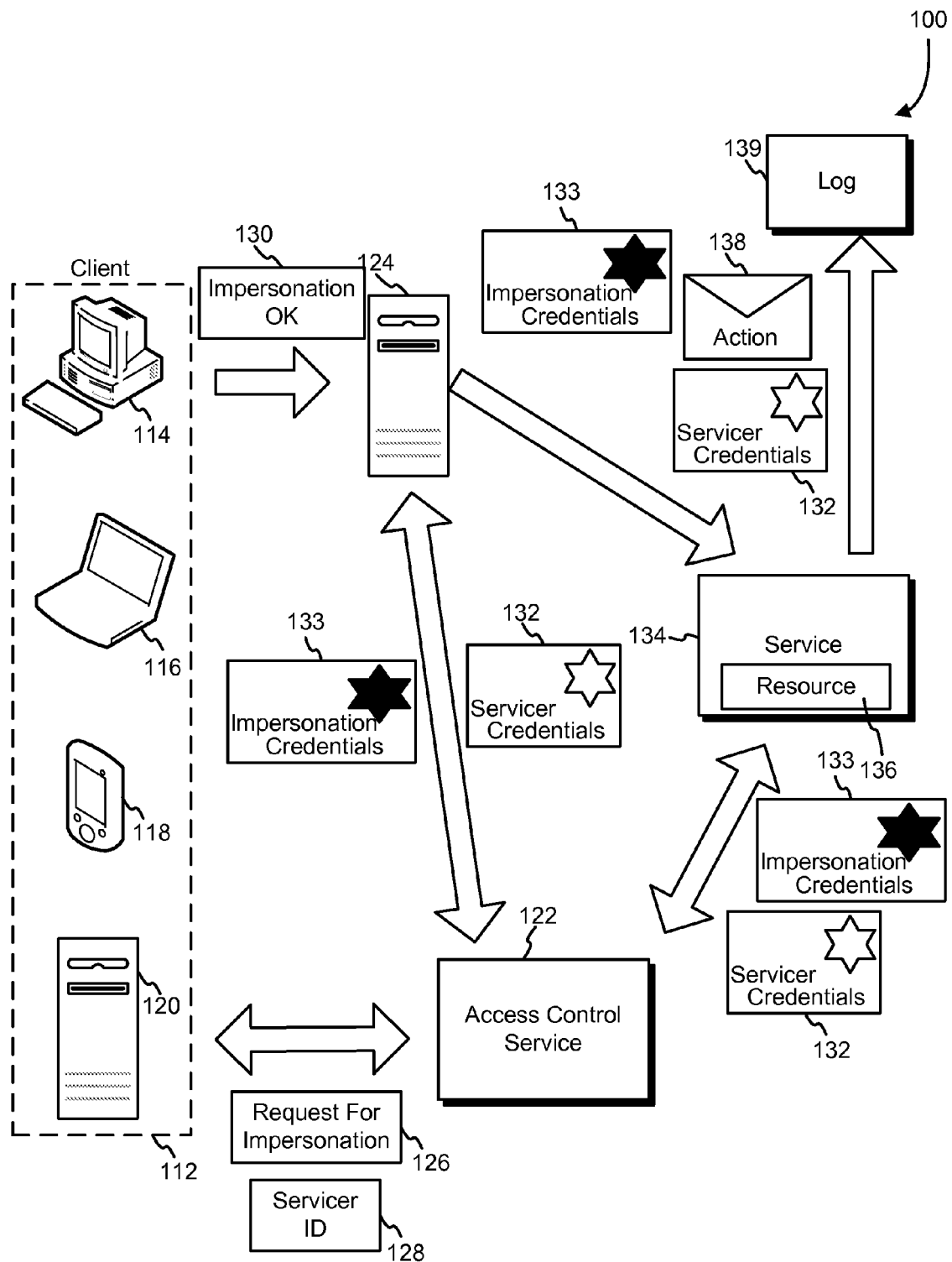
FIG. 1 shows an illustrative example of an impersonation environment using credentials in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the subject matter being described.

Techniques described and suggested herein include using client impersonation recognized by an access control service and servicer credentials to allow a servicer to impersonate a user's context while requesting actions be performed on a computing resource. In one embodiment, a servicer is requested to perform an action through impersonation, granting access to the context of a user related to the computing resource. The computing resource receives servicer credentials and a claim from the servicer. After verifying the servicer's claim, demonstrating authorization to perform actions under the context of the user, the servicer may attempt to perform the requested action. The action may be logged as performed by the servicer impersonating the user. The user may also be billed for any costs incurred. For example, a client, such as a user, can request an access control service to prepare impersonation credentials for a servicer to perform actions within the context of the user. The servicer may retrieve the impersonation credentials from the access control service using the servicer's credentials. The servicer may then request a computing resource perform an action using the impersonation credentials with the servicer credentials. The computing resource may perform the action in an environment as would exist if the user performed the request. The actions may be recorded in a log to indicate the request was performed in a client context with involvement of the servicer.

Impersonation that includes associating the servicer with the client request gives several advantages. By performing the action as if requested by the client (or under the context of the client), such as assuming the client's role and/or impersonating the client, the client context and environment are preserved while the servicer makes an explicit act to assume the client role. This explicit act is unlike other security measures, such as an access control list where access is associated with the servicer role. The client and/or service responsible for the computing resource do not need to set up a separate environment for the servicer, as the request is performed in the client context. The service responsible for the computing resource also does not need to understand the relationship between the client and servicer. In fact, in some embodiments, the computing resource may not function differently between a client request and an impersonated request. The service responsible for the computing resource may forward the impersonated request as if the client made the request to the computing resource and record the impersonation. However, the servicer may still be limited by the scope of the allowed impersonation to a subset of the context of the client. The impersonation separates the identity of the servicer from the role the servicer is assuming. For example, a log may show that a service, called "SuperBest scaling service" for the purpose of illustration, acting as a hockey website administrator under a hockey website serving profile, added a virtual machine using impersonation. This level of detail of who was impersonated may be improved over a log stating that "SuperBest scaling service" added a virtual machine (such as when using an access control list). The impersonation log entry may better indicate a context of the scaling service, such as the hockey website, as opposed to the soccer database, and who was responsible, such as, in this example, SuperBest within the context of the hockey website administrator. By logging the request as performed in a client context through involvement of the servicer, a context for the impersonation is given. In some embodiments, the log may indicate the action as performed by the client at the request of the servicer. In other embodiments, the log may indicate the action as performed by the servicer at the request and/or authorization of the client.

When delegating by associating the servicer with the client request, the history of accesses by both the client and the requestor may be known as well as the relationship between the two. In fact, specific impersonation can also be traced in the case of multiple impersonations, that is, a single impersonator is identified in a request when two clients may have granted impersonation access to a servicer for the same resource. This logging allows for tracing an origin of impersonation in complex relationships. For example, a website administrator may delegate management of virtual machines to a scaling service. The scope of authority may be management of virtual machines (or a set of one or more actions falling within the scope of management of virtual machines). Actions within the scope of authority may be starting, stopping, adding, and removing virtual machines through application programming interface (API) calls. The scope of authority may be identified in an access control policy. The scaling service may receive impersonation credentials from an access control service. The scaling service requests starts and stops of virtual machines (e.g. provisioning and deprovisioning of virtual computer systems) in the client context to react to system loads using the impersonation credentials. Each authorized stop and/or start is performed as if the website administrator had requested the stop or start him or herself. Logs may describe the stops and/or starts as performed by the website administrator through a request provided by the scaling service. As used herein, client context is used to refer to the operational environment associated with a client.

In some embodiments, a claim is used as evidence of authorization of a servicer to impersonate a client. The claim may include impersonation credentials (such as a token), a reference to impersonation credentials stored by an impersonation service, or generated data. The claim may be provided to the servicer before impersonation is allowed. In one embodiment, a servicer may prove the servicer is authorized by a client to impersonate a client by proving the servicer identity and showing a signed request signed by the client. The signed request may be from the client to the servicer requesting the servicer impersonate the client. Upon this proof, the impersonation service may generate a token that includes the impersonation credentials evidencing the authorization of the servicer to impersonate the client. In other embodiments, the impersonation service may provide a reference to credentials stored by the impersonation service. In another embodiment, the impersonation service may provide data, such as randomized data, to the servicer as part of the claim. For example, the data may be generated by the impersonation service, sent to the client for signature and then sent to the servicer for use. In another example, the data may be generated by the client, signed by the client and then registered with the impersonation service and given to the servicer.

Upon receipt of a request for impersonation having a claim, a service or authorization service may verify the authorization of a servicer to impersonate a client. In one embodiment, an authorization service verifies the identity of the servicer. The authorization service may then verify the claim of the servicer to be authorized to impersonate the client. The authorization service may then verify the servicer has permission to perform an action while impersonating the client, such as by checking an access control policy. The impersonation access control policy may be stored with the client or the servicer. The service may then perform the action and emit an audit message that an action was requested by the servicer as the client.

Turning now to FIG. 1, an impersonation environment 100 using credentials according to one embodiment is shown. A client 112, through a client machine such as a desktop 114, laptop 116, mobile device 118 and/or server 120, issues a request 126 to an access control service 122 to allow a servicer 124 to perform a set of actions on its behalf. The actions may fall within a grant of a scope of authority in an access control policy. In many cases, the scope of authority granted to the servicer 124 is smaller than the scope of authority granted to the client 112. Along with the request 126, the client 112 may provide the identity 128 of the servicer 124. If approved, the client 112 may notify the servicer 124 that the impersonation has been granted with a message 130. The servicer 124 may identify itself to the access control service 122 with servicer credentials 132. The access control service 122 may create impersonation credentials 133 allowing the servicer 124 to act within the context of the client 112 within the scope of authority granted to the servicer 124. The servicer 124 may contact a service 134 and/or resource 136 and send a request 138 that an action be performed within the scope of authority granted to the servicer 124. The service 134 and/or resource 136 may receive with the request 138 the impersonation credentials 133 and servicer credentials 132. The service 134 and/or resource 136 may verify the authorization of the servicer 124 to send a request 138 that the action be performed with the access control service 122 using the impersonation credentials 133 and servicer credentials 132. If authorized, the servicer 124 may perform the action in a client context as if the client 112 requested the action. The actions may be recorded in a log to indicate the request was performed in a client context with involvement of the servicer.

In some embodiments, the request is an API call. The API call may be an extended version of a normal API call in that it includes parameters for principal and impersonator, where a client 112 can be the principal and the servicer 124 can be the impersonator. In some embodiments, the API call may receive servicer credentials that are associated with a prior impersonation grant requested by a client. In one embodiment, the impersonation credentials may include two credentials, client credentials associated with the service providing proof of the client being authorized to access the service and client credentials associated with the access control service providing proof the servicer has been authorized to act within the context of the client. In another embodiment, bearer credentials may include client credentials associated with the service and signed authorization from the access control service. In some embodiments, the authorized actions may be included in the credentials. In other embodiments, the authorized actions may be stored in the service and/or access control service.

Figure 2:
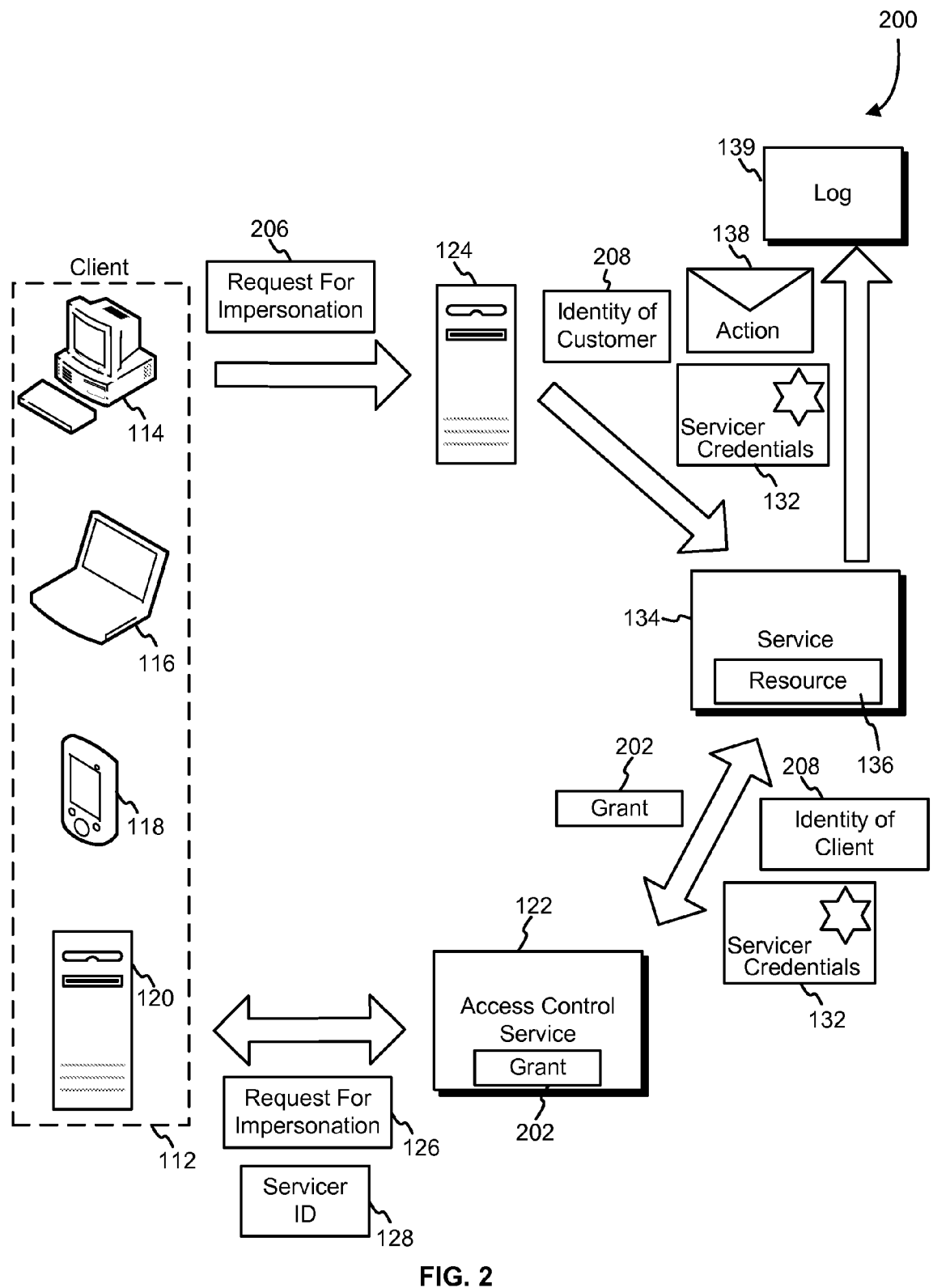
FIG. 2 shows an illustrative example of an impersonation environment using a stored grant in accordance with at least one embodiment.

Turning now to FIG. 2, an embodiment of an impersonation environment 200 using a stored grant 202 procedure is shown. A client 112, through a client machine such as a desktop 114, laptop 116, mobile device 118 and/or server 120, requests an access control service 122 to allow a servicer 124 to perform a set of actions on its behalf. The servicer 124 may be identified by an identifier 128 known to the access control service 122. The actions may fall within a grant of a scope of authority. The access control service 122 may store the grant 202 as associated with the servicer 124 and an identity of the client 208. The client may also request 206 the servicer 124 perform the set of actions on the client's behalf. The servicer 124 may contact a service 134 and/or resource 136 and send a request 138 that an action be performed within the scope of authority granted to the servicer 124. The service 134 and/or resource 136 may receive with the request 138 servicer credentials 132 and a claim that includes a client identifier 208. The service 134 and/or resource 136 may verify the authorization of the servicer 124 to send a request 138 that the action be performed with the access control service 122 using the client identifier 208 and servicer credentials 132. In some embodiments, the request 138 is also sent for authorization to perform the action. In other embodiments, the grant 202 is returned to the service 134 and/or resource 136 to determine if the action is authorized. If authorized, the servicer 124 may perform the action using a context of a client as if the client requested the action. The actions may be recorded in a log 139 to indicate the request was performed in a client context with involvement of the servicer 124.

Figure 3:
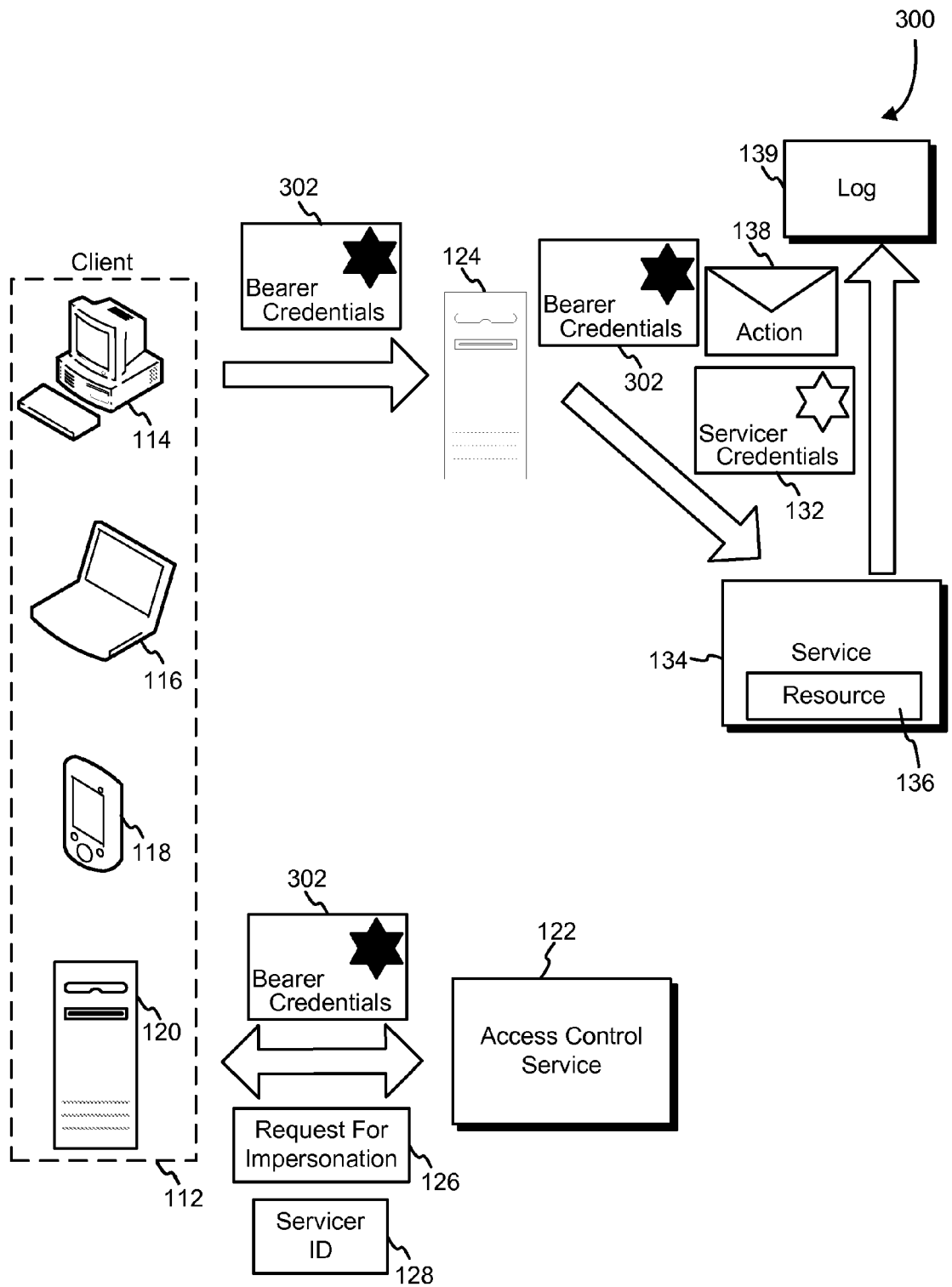
FIG. 3 shows an illustrative example of an impersonation environment using bearer credentials in accordance with at least one embodiment.

Turning now to FIG. 3, an impersonation environment 300 using bearer credentials 302 according to one embodiment is shown. A client 112, through a client machine such as a desktop 114, laptop 116, mobile device 118 and/or server 120, requests an access control service 122 to allow a servicer 124 to perform a set of actions on its behalf. The actions may fall within a grant of a scope of authority. Along with the request 126, the client may provide the identity of the servicer 124. The access control service 122 may provide bearer credentials 302, such as a secure token, to the client. The client may give the servicer 124 the bearer credentials 302 allowing the servicer 124 to act within the context of the client within the scope of authority granted to the servicer 124. The servicer 124 may contact a service 134 and/or resource 136 and send a request 138 that an action be performed within the scope of authority granted to the servicer 124. The service 134 and/or resource 136 may receive with the request 138 the bearer credentials 302 and servicer credentials 132. The service 134 and/or resource 136 may recognize the authorization of the servicer 124 to send a request 138 that the action be performed with the access control service 122 using the bearer credentials 302 and servicer credentials 132. If authorized, the servicer 124 may perform the action in a client context as if the client requested the action. The actions may be recorded in a log to indicate the request was performed in a client context with involvement of the servicer.

Bearer credentials may take several forms. In one embodiment, bearer credentials are credentials having the signature of the client and/or the access control service 122. The credentials may include access restrictions such as IP address, times, authorized servicers, duration, expiration date, protocol and/or other limits on time, place or manner of access. In some embodiments, the bearer credentials are tied to a servicer 124, such as by being associated with a servicer 124 in a data store.

Figure 4:
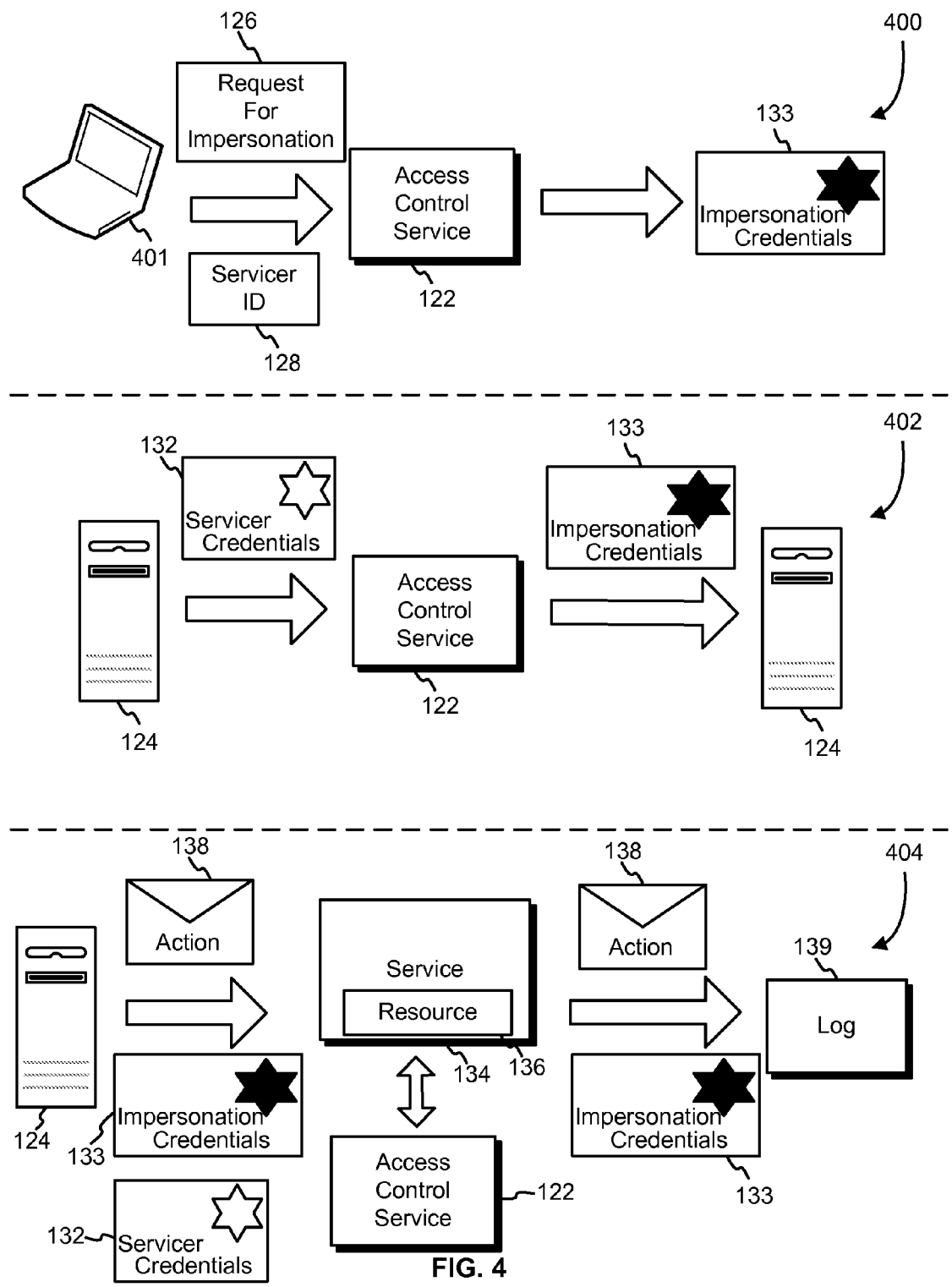
FIG. 4 shows an illustrative example of communication in an impersonation environment using credentials in accordance with at least one embodiment.

Turning now to FIG. 4, communication in an impersonation environment using credentials is shown in accordance with one embodiment. The method may include a setup phase 400, a distribution phase 402 and a use phase 404. During the setup phase 400, a client 401 may send a request for impersonation that includes a servicer identity 128 to an access control service 122. The access control service 122 may then create impersonation credentials 133. During the distribution phase 402, a servicer 124 may retrieve the impersonation credentials 133 from the access control service 122 by providing its servicer credentials 132. During the use phase 404, a servicer 124 may send a request 138 to perform an action to a service 134 and/or resource 136 within the context of the client 401. The request 138 may include impersonation credentials 133 and servicer credentials 132. The service 134 and/or resource 136 may verify the credentials. The verifying may be through a message to the access control service 122, a public key, shared secret or other use of the credentials and/or access control service. Once verified, the service 134 and/or resource 136 may perform the action in a client context as if the client requested the action. The actions may be recorded in a log 139 to indicate the request was performed in a client context with involvement of the servicer 124.

Impersonation credentials may be created in multiple ways. In one embodiment, the impersonation credential is created by the client 401 and signed by the access control service 122. In another embodiment, the impersonation credential is created by the service 134 and/or resource 136 and signed by the access control service 122. In some embodiments, a servicer requests the impersonation credential. A client will approve the servicer's request, after which the impersonation credential is created by the access control service 122 and delivered to the servicer 124. In some embodiments, a service provider, such as a program execution service provider, may provide infrastructure for the servicer 124, service 134, access control service 122 and/or client 401. In one embodiment, the service provider may request the impersonation credential within the context of the servicer. For example, a client may select a configuration of a database from a service provider. The service provider may request a credential from the access control service to give to a database servicer to perform the client's requested setup.

Figure 5:
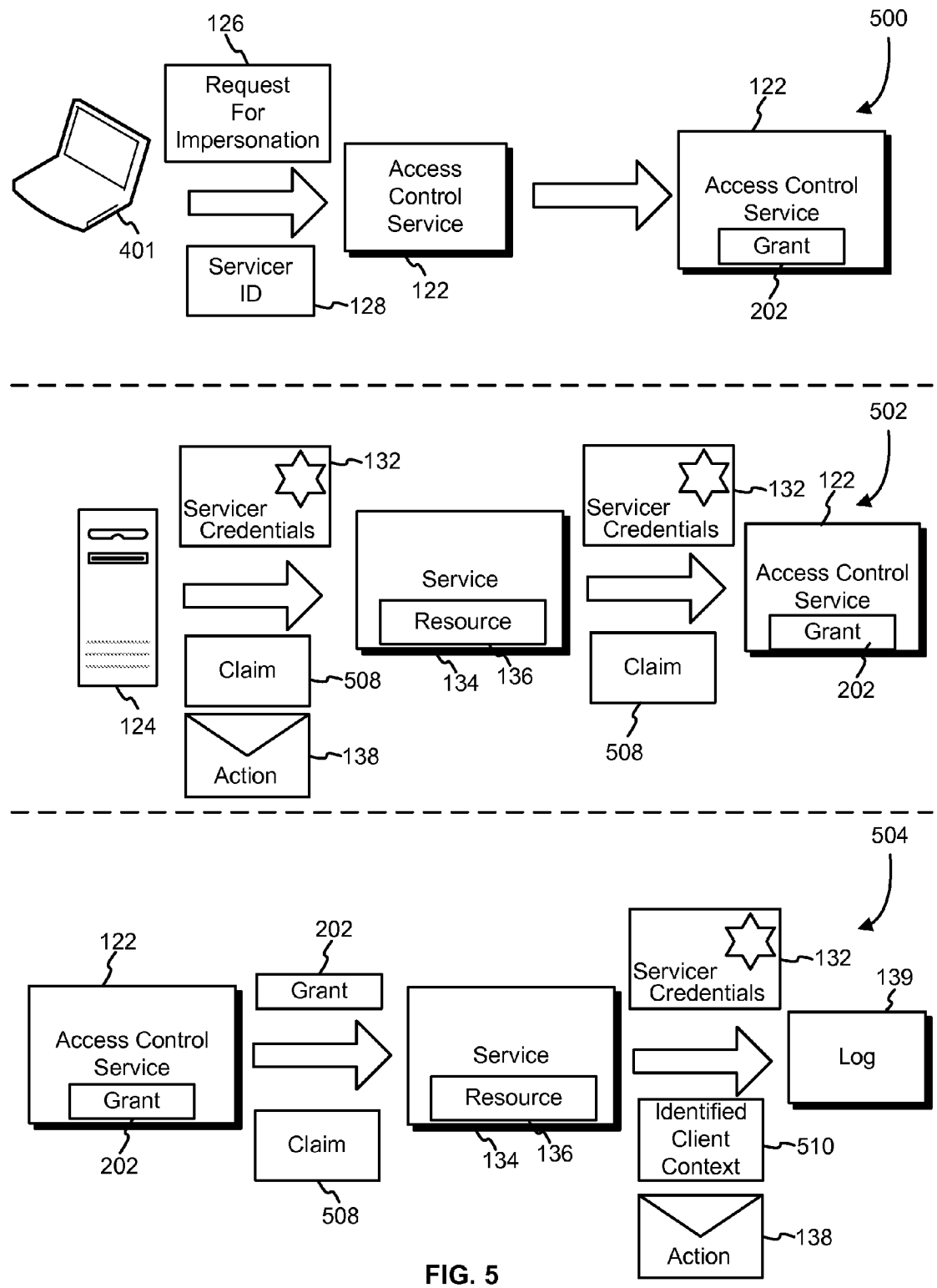
FIG. 5 shows an illustrative example of communication in an impersonation environment using a stored grant in accordance with at least one embodiment.

Turning now to FIG. 5, communication in an impersonation environment using a stored grant is shown in accordance with one embodiment. The method may include a setup phase 500, a request phase 502 and a performance phase 504. During the setup phase 500, a client 401 may send a request 126 to an access control service 122 that a set of actions be delegated to a servicer 124 with a servicer identity 128. If approved, in an embodiment, the access control service 122 will store a grant 202 representing the impersonation of actions. During the request phase 502, a servicer 124 may send a request 138 to a service 134 and/or resource 136 to perform an action within the context of the client 401. The request 138 may be accompanied by servicer credentials 132 and a claim 508. In the embodiment shown, servicer credentials 132 and the claim 508 are sent to the access control service 122 to be verified. During the performance phase 504, the access control service 122 may authorize the delegated action and provide more specifics on the identity of the client, if needed. In the embodiment shown, the service 134 and/or resource 136 makes the decision to allow the action as the grant is passed to the service 134 and/or resource 136. In other embodiments, the access control service 122 may make the decision to allow and pass it to the service 134 and/or resource 136. Once verified, the service 134 and/or resource 136 may perform the action in a client context as if the client 401 requested the action. The actions may be recorded in a log to indicate the request was performed in an identified client context 510 with involvement of the servicer.

Using a claim 508 may help in preventing theft of an impersonation credential. An impersonation credential can be used to generate many claims, which can avoid exposing the credential itself to theft. In one embodiment, the servicer 124 receives the impersonation credential and uses the impersonation credential to generate a claim 508. The resulting claim 508 is presented to a system owned by a service provider. In this embodiment, the servicer 124 is the claim constructor.

Figure 6:
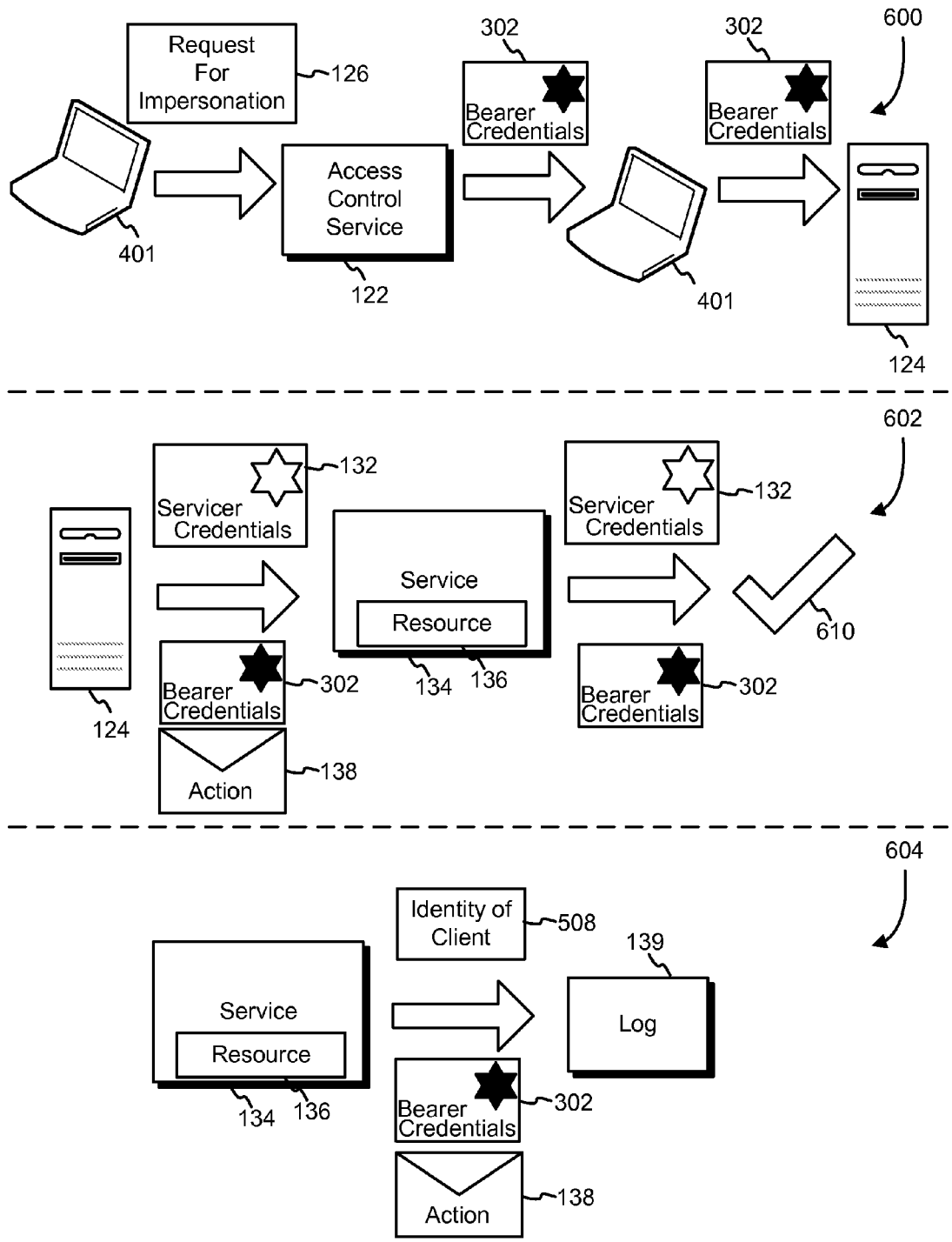
FIG. 6 shows an illustrative example of communication in an impersonation environment using bearer credentials in accordance with at least one embodiment.

Turning now to FIG. 6, communication in an impersonation environment using bearer credentials is shown in accordance with one embodiment. The method may include a setup phase 600, a use phase 602 and a log phase 604. During the setup phase, a client 401 may send a request 126 to an access control service 122 to allow a servicer 124 to perform actions within the context of the client 401. If approved, the access control service 122 may provide bearer credentials 302. In the embodiment shown, the bearer credentials 302 are returned to the client 401 and forwarded to the servicer 124. In some embodiments, the servicer 124 may retrieve the bearer credentials 302 itself. During the use phase 602, the servicer 124 may send a request 138 to perform an action to a service 134 and/or resource 136. The request may be accompanied by the bearer credentials 302 and servicer credentials 132. The service 134 and/or resource 136 may use the bearer credentials 302 and servicer credentials 132 to determine if the servicer 124 is authorized 610 to perform the action. For example the bearer credentials 302 may contain the grant given to the servicer 124. The service 134 and/or resource 136 may verify the authenticity of the bearer credentials 302, such as through a signature, and determine the action is with a scope of delegated authority. Once verified, the service 134 and/or resource 136 may perform the action in a client context as if the client 401 requested the action. The actions may be recorded in a log to indicate the request was performed in a client context with involvement of the servicer.

Figure 7:
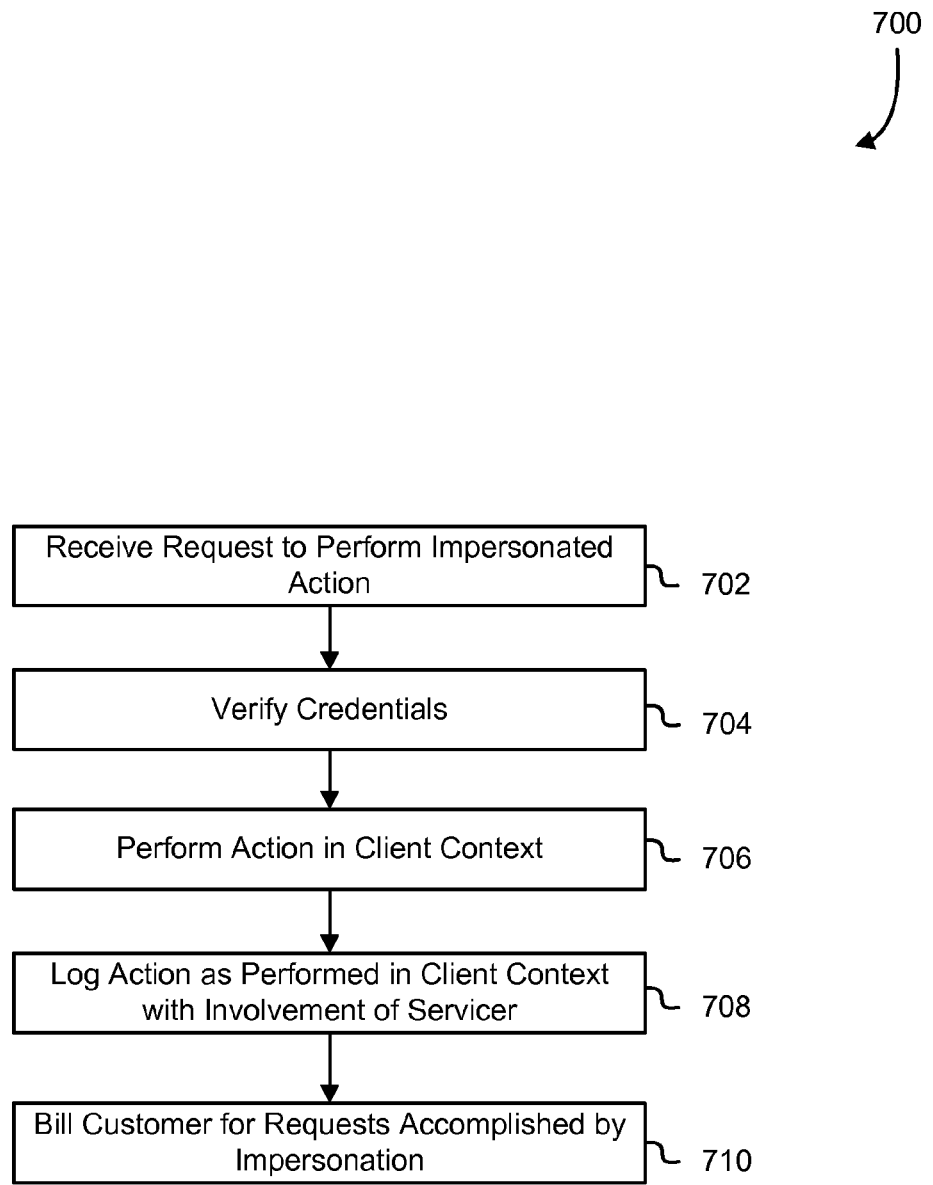
FIG. 7 shows an illustrative example of a process that may be used to perform impersonation in accordance with at least one embodiment.

Turning now to FIG. 7, a process 700 that may be used to perform impersonation in accordance with at least one embodiment is shown. For example, as seen in FIG. 1, a client 112 may delegate a scope of authority to a servicer 124 to request actions of a service 134 and/or resource 136 be performed within the context of the client 112. A service 134 and/or resource 136 may receive 702 a request to perform a desired action within the context of a client. The service 134 and/or resource 136 may verify 704 the credentials of the servicer 124 as authorized to perform the desired action within the context of the client 112. Upon verification, the service 134 and/or resource 136 may perform 706 the action using the context of the client. The actions may be recorded 708 in a log to indicate the request was performed in a client context with involvement of the servicer 124. The client may be billed 710 for usage accrued through the delegated request.

Figure 8:
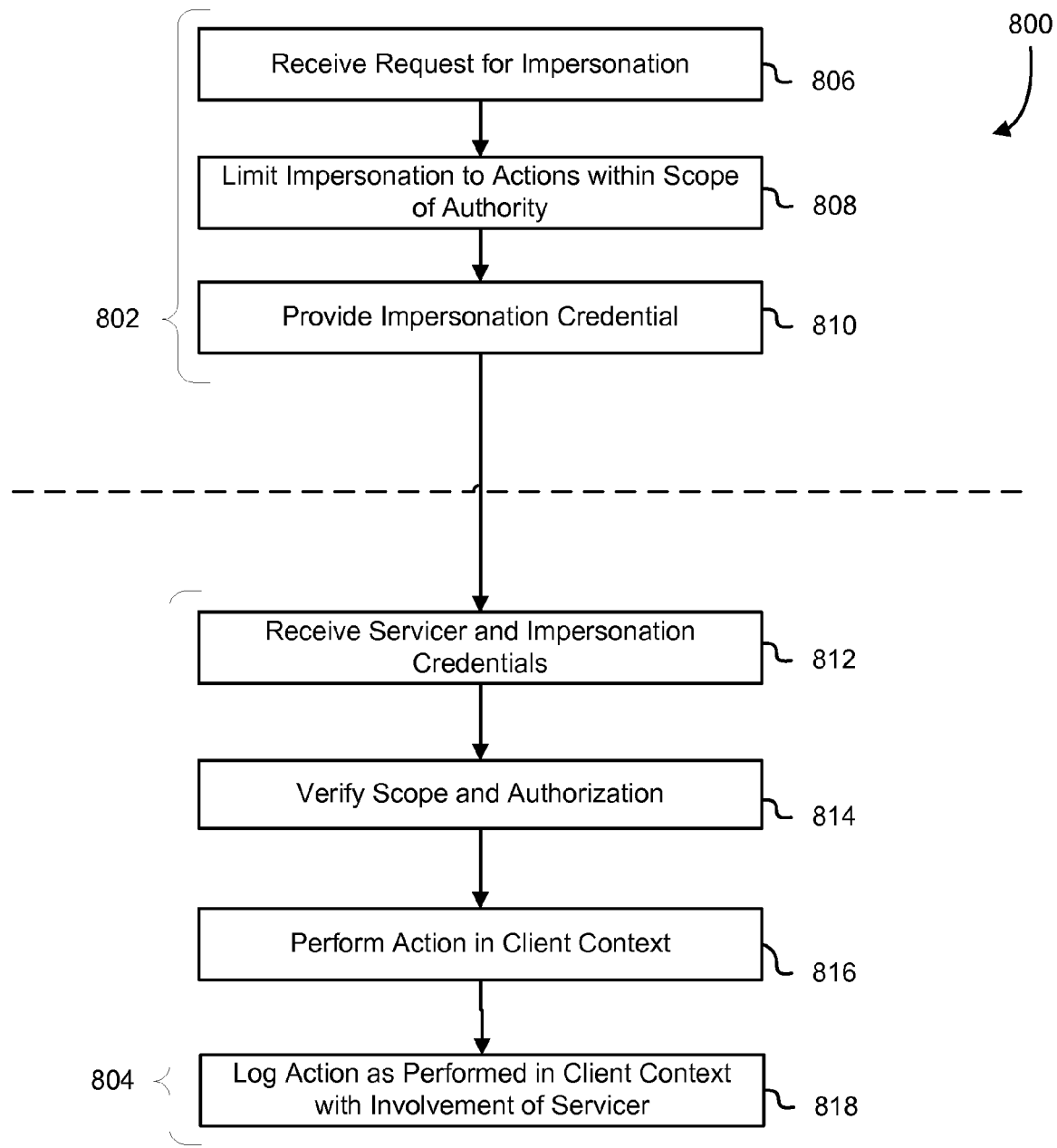
FIG. 8 shows an illustrative example of a process that may be used to perform impersonation using credentials in accordance with at least one embodiment.

Turning now to FIG. 8, a process that may be used to perform impersonation using credentials in accordance with at least one embodiment is shown. For example, as seen in FIG. 1, a client, such as a client, may delegate a scope of authority to a servicer 124 to request actions of a service 134 and/or resource 136 be performed within the context of the client using impersonation credentials 133. Some or all of the process 800 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware, or combinations thereof. The code may be stored on a computer-readable storage medium, for example, in the form of a computer program comprising a plurality of instructions executable by one or more processors. The computer-readable storage medium may be non-transitory.

The process may occur in two phases, a setup phase 802 and an execution phase 804. The setup phase 802 may begin by an authorization server receiving 806 a request for impersonation of a client by a servicer. The impersonation of the servicer 124 as the client may be limited 808 to a subset of actions within a scope of authority. The authorization server may provide 810 an impersonation credential to the servicer 124. In the execution phase 804, a service 134 and/or resource 136 may receive 812 servicer credentials and impersonation credentials from the servicer 124. The service 134 and/or resource 136 may verify 814 the action is within a scope of authority and the servicer 124 is authorized to perform the impersonated action. Once verified, the service 134 and/or resource 136 may perform 816 the action as if requested by the client. The actions may be recorded 818 in a log to indicate the request was performed in a client context with involvement of the servicer.

Impersonation of tasks may be limited by all three parties to the impersonation. These may include restrictions on the access control service, servicer and client. In one embodiment, the access control service may be restricted from authorizing certain actions or parties by an administrator or a client. For example, a website administrator may require that an impersonation of the administrator be limited to a first servicer and not be further performed by a second servicer impersonating the first servicer impersonating the website administrator. In another embodiment, a servicer may be restricted in the manner in which actions are performed. For example, the servicer may face access restrictions such as IP address, times, authorized servicers, duration, expiration date, protocol and/or other limits on time, place or manner of access. In some embodiments, the client may be restricted to approved impersonations, including actions and servicers. For example, a client may be restricted to allowing a few actions be impersonated by an untrusted third party, but may allow impersonation of many actions by a service provider in control of the access control service and/or the resource.

Verification of the credentials may be done in several ways. In one embodiment, the impersonation credential is signed with a private key that may be verified with a public key from the access control service. In another embodiment, the impersonation credential is sent to the access control service to verify authority and authenticity. In another embodiment, the servicer and access control service share a secret that may be used to verify the credentials without further contact with the access control service.

The credentials may be associated with different systems. In one embodiment, the servicer credential is related to the access control service. In another embodiment, the servicer credential is one associated with the service and/or resource. In another embodiment, the impersonation credential is used to relate a servicer credential with an authorization server to a servicer credential with the service and/or resource. By relating the different identities with a credential, the service may trust the servicer's impersonation.

Figure 9:
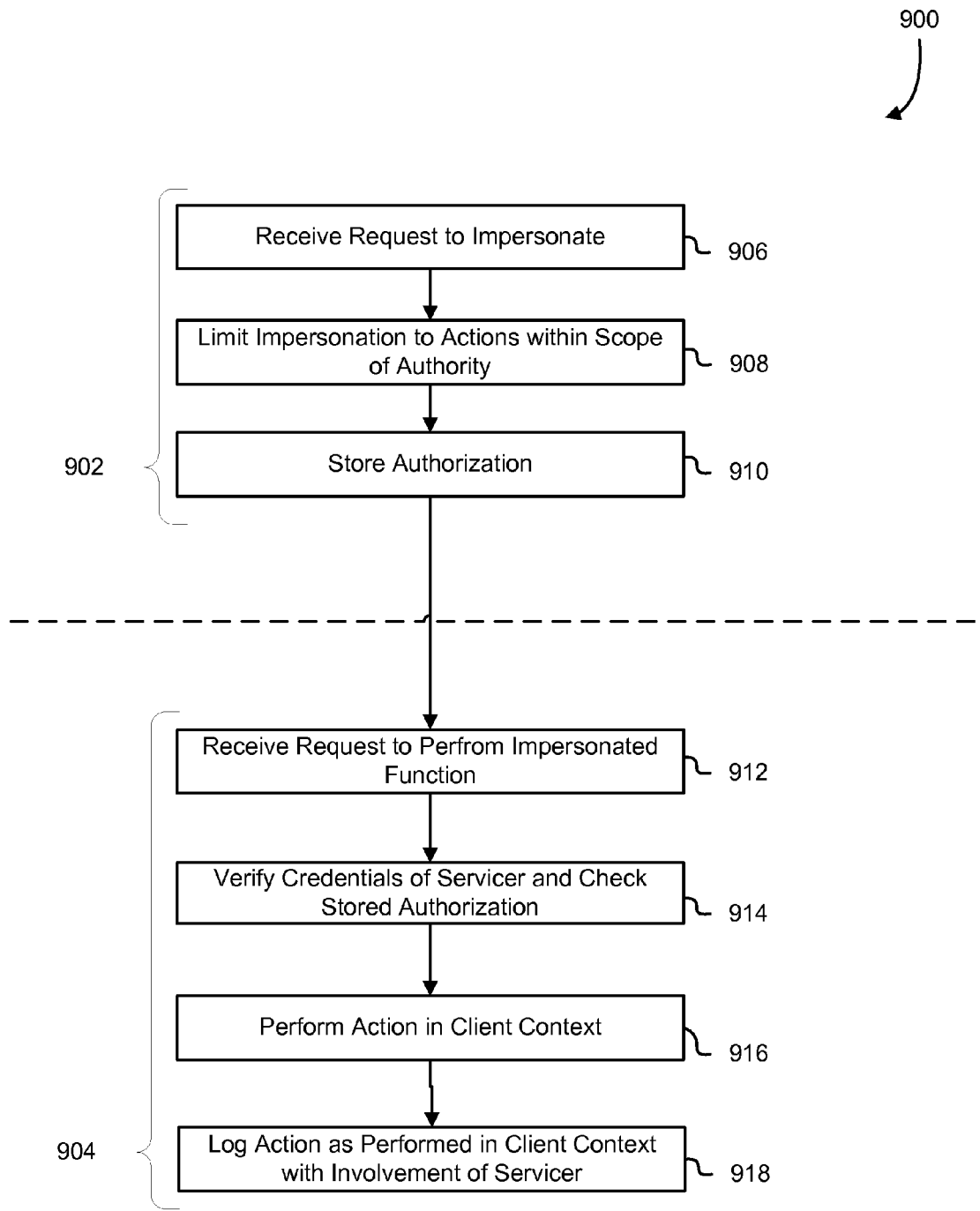
FIG. 9 shows an illustrative example of a process that may be used to perform impersonation using a stored grant in accordance with at least one embodiment.

Turning now to FIG. 9, a process 900 that may be used to perform impersonation using a stored grant in accordance with at least one embodiment is shown. For example, as seen in FIG. 2, a client, such as a customer, may allow impersonation within a scope of authority by a servicer 124, allowing the servicer to request actions of a service 134 and/or resource 136 be performed within the context of the client using a stored grant 202. The process may occur in two phases, a setup phase 902 and an execution phase 904. The setup phase 902 may begin by an authorization server receiving 906 a request to allow impersonation of a client by a servicer for a task. The impersonation of the servicer 124 by the client may be limited 908 to a subset of actions within a scope of authority. The authorization server may store 910 the impersonation authorization. In the execution phase 904, a service 134 and/or resource 136 may receive 912 servicer credentials and a client identifier from the servicer 124. The service 134 and/or resource 136 may verify 914 with the authorization server that the action is within scope and the servicer 124 is authorized to perform the impersonated action as stored in the impersonation authorization. Once verified, the service 134 and/or resource 136 may perform 916 the action as if requested by the client. The actions may be recorded 918 in a log to indicate the request was performed in a client context with involvement of the servicer.

Figure 10:
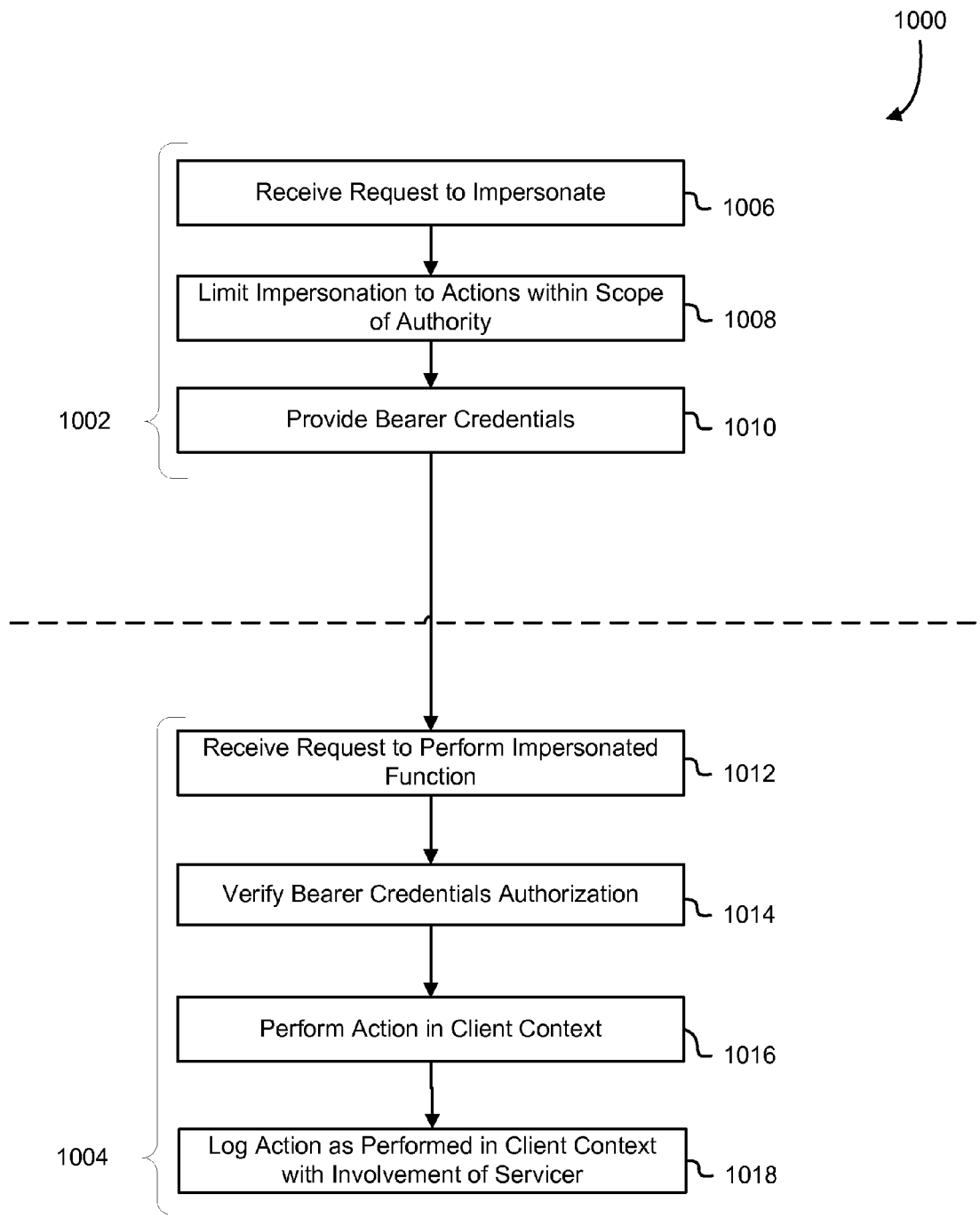
FIG. 10 shows an illustrative example of a process that may be used to perform impersonation using a bearer credential in accordance with at least one embodiment.

Turning now to FIG. 10, a process 1000 that may be used to perform impersonation using a bearer credential in accordance with at least one embodiment is shown. For example, as seen in FIG. 3, a client, such as a customer, may allow impersonation within a scope of authority by a servicer 124 to allow actions of a service 134 and/or resource 136 be performed within the context of the client using bearer credentials 302. The process may occur in two phases, a setup phase 1002 and an execution phase 1004. The setup phase 1002 may begin by an authorization server receiving 1006 a request for impersonation to perform a task. The impersonation allowed to the servicer 124 by the client may be limited 1008 to a subset of actions within a scope of authority. Based on the subset of actions, the authorization server may create bearer credentials. The bearer credentials may be provided 1010 to the client to distribute to the servicer. In other embodiments, the bearer credentials may be distributed directly to the servicer. In the execution phase 1004, a service 134 and/or resource 136 may receive 1012 servicer credentials and bearer credentials from the servicer 124. The service 134 and/or resource 136 may verify 1014 that the action is within a scope of authority and the servicer 124 is authorized to perform the impersonated action as described in the bearer credentials. Once verified, the service 134 and/or resource 136 may perform 1016 the action as if requested by the client. The actions may be recorded 1018 in a log to indicate the request was performed in a client context with involvement of the servicer.

It should be recognized that impersonation may occur several levels deep. For example, a client may allow impersonation to perform a task by a first servicer through the impersonation processes and systems described above. The first servicer may then in turn allow impersonation of a subset of the task to a second servicer through the impersonation processes and systems described above. In some embodiments, the chain of impersonation is stored in the impersonation credentials or bearer credentials. In another embodiment, the chain of impersonation is stored in the access control service 122 as part of the grant. However, by allowing this impersonation, actions may be performed within the context of an original client no matter the levels of impersonation. In one embodiment, as each servicer does not receive its own context, only a grant, permissions follow the grant and the client's context. A servicer would receive any benefit of changes to the client's context.

It should also be recognized that systems described herein may include one or more computer systems. In some embodiments, an authorization server, servicer, client, service and/or resource may all include one or more computing systems and/or computing resources. For example, an authorization server as shown in FIG. 1 may include several virtual machines to respond to client, servicer and/or service/resource requests.

Figure 11:
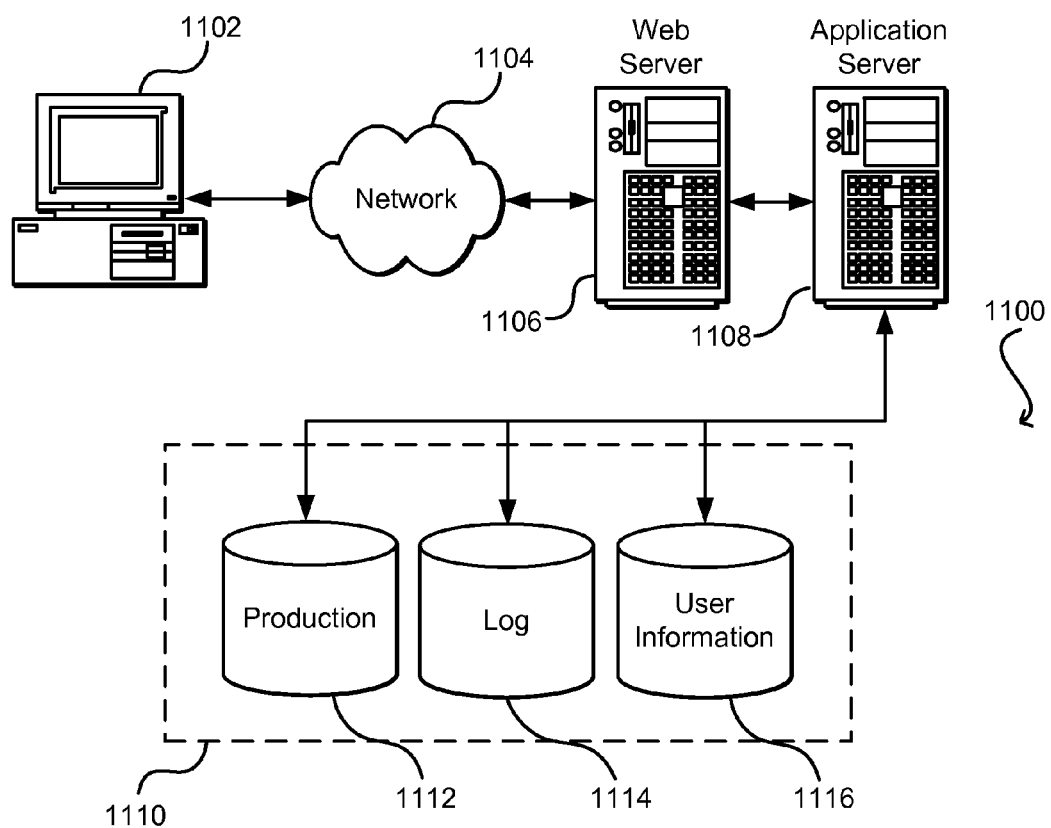
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases, or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature, and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the various embodiments as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the scope of the claimed subject matter to the specific form or forms disclosed, but on the contrary, the intention is to cover all modifications, alternative constructions, and equivalents falling within the spirit and scope of the various embodiments, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate various embodiments and does not pose a limitation on the scope of the claimed subject matter unless otherwise indicated. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for providing impersonation services, comprising:
   receiving, by a web service and from a servicer, a request to perform an action while impersonating a customer, the action to be performed in a customer environment of a plurality of customer environments hosted by the web service, the request including at least one claim, the claim based at least in part on an impersonation credential of the customer from an impersonation service, the impersonation credential being based at least in part on a scope of authority to impersonate and based at least in part on an identity of the servicer, the impersonation credential comprising information about an authorization of the customer for an impersonation by the servicer;
   verifying, by the web service with the impersonation service, the identity of the servicer, the claim of the servicer to impersonate the customer, and a permission of the servicer to perform the action while impersonating the customer, the verifying based at least in part on the impersonation credential and a servicer credential, the servicer credential comprising information to authenticate the servicer in association with accessing the plurality of customer environments; and
   providing, by the web service to the servicer, access to the customer environment to perform the action in the customer environment as if the action were requested by the customer based at least in part on the identity, the claim, and the permission being verified.

2. The computer-implemented method of claim 1, wherein the method further comprises generating an access control policy that limits the servicer to requests satisfying one or more access restrictions, the access restrictions selected from IP address, time, duration, expiration date or protocol.

3. The computer-implemented method of claim 1, wherein the method further includes emitting an audit message that the action was performed by the customer.

4. The computer-implemented method of claim 1, wherein the method further includes emitting an audit message that the action was taken by the servicer as the customer.

5. The computer-implemented method of claim 1, wherein performing the action in the customer environment further comprises restricting the customer environment during impersonation to a subset of the customer environment.

6. The computer-implemented method of claim 1, wherein the method further comprises restricting the servicer to a set of actions authorized during impersonation of the customer.

7. A computer-implemented method for providing impersonation services, comprising:
   receiving, by a web service, a request from a servicer to execute an action in a client environment of a plurality of client environments hosted by the web service, the request including a claim, the claim based at least in part on an impersonation credential of a client from an impersonation credential, the impersonation credential being based at least in part on an authorization of the client for the servicer to impersonate the client and on an identity of the servicer;

verifying, by the web service with the impersonation service, the claim to impersonate the client based at least in part on the impersonation credential and a servicer credential, the servicer credential comprising information to authenticate the servicer in association with accessing the plurality of client environments; and providing, by the web service to the servicer, access to the client environment to execute the action in the client environment based at least in part on the claim being verified.

8. The computer-implemented method of claim 7, wherein receiving a request from a servicer further comprises receiving a token including the impersonation credential.

9. The computer-implemented method of claim 7, wherein receiving a request from a servicer further comprises receiving a reference identifier to the impersonation credential, the impersonation credential stored by the impersonation service.

10. The computer-implemented method of claim 7, wherein verifying, with the impersonation service, the claim to impersonate the client further comprises determining that the action is allowed by an access control policy covering the request.

11. The computer-implemented method of claim 7, wherein receiving a request from a servicer further comprises receiving signed data, the data having been previously given to the servicer as evidence of authorization of the servicer to impersonate the client, the signed data having been signed by the client.

12. The computer-implemented method of claim 7, wherein the client environment is a program execution service.

13. A computer system for enabling impersonation services, comprising:
one or more processors; and
memory, including instructions executable by the one or more processors to cause the computer system to at least:
receive a request to allow a servicer to impersonate a client in association with executing an action in a client context of a plurality of client contexts hosted by a web service;
verify an authorization by the client to allow the servicer to impersonate the client;
generate, based at least in part on the authorization being verified and an identity of the servicer, an impersonation credential as evidence that the servicer is authorized to impersonate the client;
receive, from a resource of the web service, information about a claim associated with the servicer, the information comprising the impersonation credential and a servicer credential, a verification of the claim allowing the servicer to access the resource to execute the action in the client context while impersonating the client, the service credential comprising information to authenticate the servicer in association with accessing the plurality of client contexts; and
verify the claim based at least in part on the impersonation credential and the servicer credential, the verifying enabling the web service to provide the servicer access to the resource to execute the action in the client context while impersonating the client.

14. The computer system of claim 13, wherein the executable instructions further cause the computer system to at least:

receive a second request, the second request including the claim, the claim based at least in part on the impersonation credential; and
execute the action in the client context, the client context based at least in part on the claim.

15. The computer system of claim 13, wherein verifying an authorization by the client to allow the servicer to impersonate the client further comprises:
receiving a signed request from the client to the servicer requesting the servicer to impersonate the client; and
verifying that the signed request is signed by the client.

16. The computer system of claim 13, wherein the request causes costs to accrue to the client.

17. The computer system of claim 13, wherein the instructions further comprise instructions that, when executed by the one or more processors, cause the computer system to at least generate an access control policy for the impersonation of the client by the servicer.

18. The computer system of claim 17, wherein the access restrictions of the access control policy are selected from IP address, times, authorized servicers, duration, expiration date or protocol.

19. One or more non-transitory computer-readable storage media having collectively stored thereon executable instructions that, when executed by one or more processors of a computer system, cause the computer system to at least:
receive, from a servicer, a request to allow the servicer to impersonate a client in association with executing an action in a client context of a plurality of client contexts hosted by a web service;
receive, from the client, an approval of the request;
generate an impersonation credential based at least in part on the approval of the servicer to impersonate the client and based at least in part on an identity of the servicer;
receive, from a resource of the web service, information about a claim and the impersonation credential, a verification of the claim allowing the servicer to access the resource to execute the action in the client context while impersonating the client; and
verify the claim to the servicer based at least in part on the impersonation credential and a servicer credential, the service credential comprising information to authenticate the servicer in association with accessing the plurality of client contexts, the verifying enabling the web service to provide the servicer access to the resource to execute the action in the client context while impersonating the client.

20. The non-transitory computer-readable storage media of claim 19, wherein the executable instructions further cause the computer system to at least:
receive a second request, the second request including the claim, the claim based at least in part on the impersonation credential; and
execute the action in the client context, the client context based at least in part on the claim.

21. The non-transitory computer-readable storage media of claim 19, wherein receiving the approval further comprises receiving a signed request from the client to the servicer to impersonate the client.

22. The non-transitory computer-readable storage media of claim 20, wherein the executable instructions further cause the computer system to at least:
limit the servicer to a subset of actions available to the client while the servicer is impersonating the client.

23. The non-transitory computer-readable storage media of claim 22, wherein the executable instructions further cause the computer system to at least:

limit the servicer to a window of time in which requests to perform the subset of actions will be authorized.

24. The non-transitory computer-readable storage media of claim 19,
wherein the client is a first servicer;
wherein the servicer is a second servicer; and
wherein the request comprises a first servicer request that a second servicer be authorized to perform the set of actions within the context of a first client that previously authorized the first servicer to act within the context of the first client.

25. The non-transitory computer-readable storage media of claim 22, wherein the executable instructions further cause the computer system to at least recommend the subset of actions to the client based at least in part on the request.

26. The non-transitory computer-readable storage media of claim 19, wherein the executable instructions further cause the computer system to at least send the impersonation credential to the servicer, the impersonation credential representing authorization of the servicer to perform the subset of actions within the context of the client.

27. The non-transitory computer-readable storage media of claim 19, wherein the impersonation credential is stored by an authorization server.

28. The non-transitory computer-implemented method of claim 27, wherein the claim includes a public identifier for an account of the client with an authorization servicer, and wherein the impersonation credential is associated with the public identifier.

29. The non-transitory computer-readable storage media of claim 19, wherein the claim includes data, and wherein the data is signed by the servicer to validate a claim to the authorization service.

30. The computer-implemented method of claim 1, wherein the impersonation credential is further generated based at least in part on a client credential, wherein the client credential is associated with access of the client to the web service, and wherein the client credential and the authorization for the servicer to impersonate the client are provided to the impersonation service to generate the impersonation credential.

31. The or more non-transitory computer-readable storage media of claim 19, wherein the approval of the request comprises a scope of authority to impersonate, wherein the scope of authority and the identity of the servicer are received from the client, and wherein the verifying is based at least in part on the scope of authority and the identity of the servicer.

* * * * *